United States Patent [19]

Haddad et al.

[11] Patent Number: 4,853,107

[45] Date of Patent: Aug. 1, 1989

[54] METHOD AND APPARATUS FOR REMOVING SMALL CATALYST PARTICLES IN FCC SYSTEMS

[75] Inventors: James H. Haddad, Princeton Junction; Hartley Owen, Belle Mead, both of N.J.

[73] Assignee: Mobil Oil Corp., New York, N.Y.

[21] Appl. No.: 667,661

[22] Filed: Nov. 2, 1984

[51] Int. Cl.$^4$ .............................................. C106 11/18
[52] U.S. Cl. .................... 208/152; 208/113; 208/161; 208/164
[58] Field of Search ............... 208/152, 149, 153, 161, 208/164, 113; 422/145, 144, 147

[56] References Cited

U.S. PATENT DOCUMENTS

| | | | |
|---|---|---|---|
| 2,596,748 | 5/1952 | Watson et al. | 208/152 |
| 2,786,800 | 3/1957 | Myers | 208/152 |
| 2,893,949 | 7/1959 | Prater | 208/150 |
| 2,984,358 | 5/1961 | Johnston | 208/152 |
| 3,083,082 | 3/1963 | Kleiber | 208/161 |
| 3,554,903 | 1/1971 | Wilson | 208/164 |
| 4,055,486 | 10/1977 | Choi et al. | |
| 4,220,623 | 9/1980 | Jahnke et al. | |
| 4,282,084 | 8/1981 | Gross | |
| 4,337,068 | 6/1982 | MacLean et al. | |
| 4,387,043 | 6/1983 | Vickers et al. | |
| 4,394,349 | 7/1983 | Cartmell | 208/153 |
| 4,404,095 | 9/1983 | Haddad et al. | 208/153 |

*Primary Examiner*—Anthony McFarlane
*Attorney, Agent, or Firm*—Alexander J. McKillop; Charles J. Speciale; Dennis P. Santini

[57] ABSTRACT

Disclosed is a method of and apparatus for reducing the level of extremely small catalyst particles ("fines") in an FCC system by temporarily retaining particles separated from the secondary cyclone separator in either a reactor vessel or catalyst regenerator. These particles can be withdrawn from the temporary retaining area, which takes them out of the active catalyst inventory within the reactor/regenerator system. The withdrawing of catalyst "fines" reduces the particulate contamination both in flue gas exhausted to the atmosphere from the catalyst regenerator and in the main column bottom (MCB) products from the fractionation stage. Preferred embodiments include withdrawal of "fines" from either the regenerator or the reactor vessels and the secondary cyclones contained in each of these vessels.

2 Claims, 1 Drawing Sheet

METHOD AND APPARATUS FOR REMOVING SMALL CATALYST PARTICLES IN FCC SYSTEMS

BACKGROUND OF THE INVENTION

1. Field of the Invention

The present invention relates to a method of and apparatus for reducing the catalyst particulate contamination in flue gas and main column bottom liquids in a fluidic catalytic cracking (FCC) system without resort to tertiary catalyst recovery equipment. More particularly, the present invention relates to a method of and apparatus for removing extremely small catalyst particles from the catalyst inventory in an FCC system.

2. Discussion of the Prior Art

The field of catalytic cracking, particularly fluid catalytic cracking, has undergone significant development improvements due primarily to advances in catalyst technology and product distribution obtained therefrom. With the advent of high activity catalysts and particularly crystalline zeolite cracking catalysts, new areas of operating technology have been encountered, requiring refinements in processing techniques to take advantage of the high catalyst activity, selectivity and operating sensitivity.

By way of background, the hydrocarbon conversion catalyst usually employed in an FCC installation is preferably a high activity crystalline zeolite catalyst of a fluidizable particle size. The catalyst is transferred in suspended or dispersed phase condition with a hydrocarbon feed generally upwardly through one or more riser conversion zones (FCC cracking zones), providing a hydrocarbon residence time in each conversion zone in the range of 0.5 to about 10 seconds, and usually less than about 8 seconds. High temperature riser hydrocarbon conversions, occurring at temperatures of at least 1000° F. or higher and at 0.5 to 4 seconds hydrocarbon residence time in contact with the catalyst in the riser, are desirable for some operations before initiating separation of vaporous hydrocarbon product materials from the catalyst.

Rapid separation of catalyst from hydrocarbons discharged from a riser conversion zone is paricularly desirable for restricting hydrocarbon conversion time. During the hydrocarbon conversion step, carbonaceous deposits accumulate on the catalyst particles and the particles entrain hydrocarbon vapors upon removal from the hydrocarbon conversion zone. The entrained hydrocarbons are subjected to further contact with the catalyst until they are removed from the catalyst by a separator, which could be a mechanical means, and/or stripping gas in a separate catalyst stripping zone. Hydrocarbon conversion products separated from and materials stripped from the catalyst are combined and passed to a product fractionation step. Stripped catalyst containing deactivating amounts of carbonaceous material, hereinafter referred to as coke, is then passed to a catalyst regeneration operation.

Movement of catalyst particles through the riser conversion zone, through various inertial and cyclone separators, through catalyst stripper baffles and through the catalyst regenerator, causes substantial catalyst particle breakage and over time will reduce the average size of catalyst particles in a dense bed storage area inventory. As is well known, the smaller the particle size, the more easily entrained that particle is in an airflow of a given velocity, and the particle can be carried by either gaseous hydrocarbon effluent passing from the reactor vessel to the fractionator or by flue gas travelling from the catalyst regenerator to the atmosphere.

Figures 1, 4:
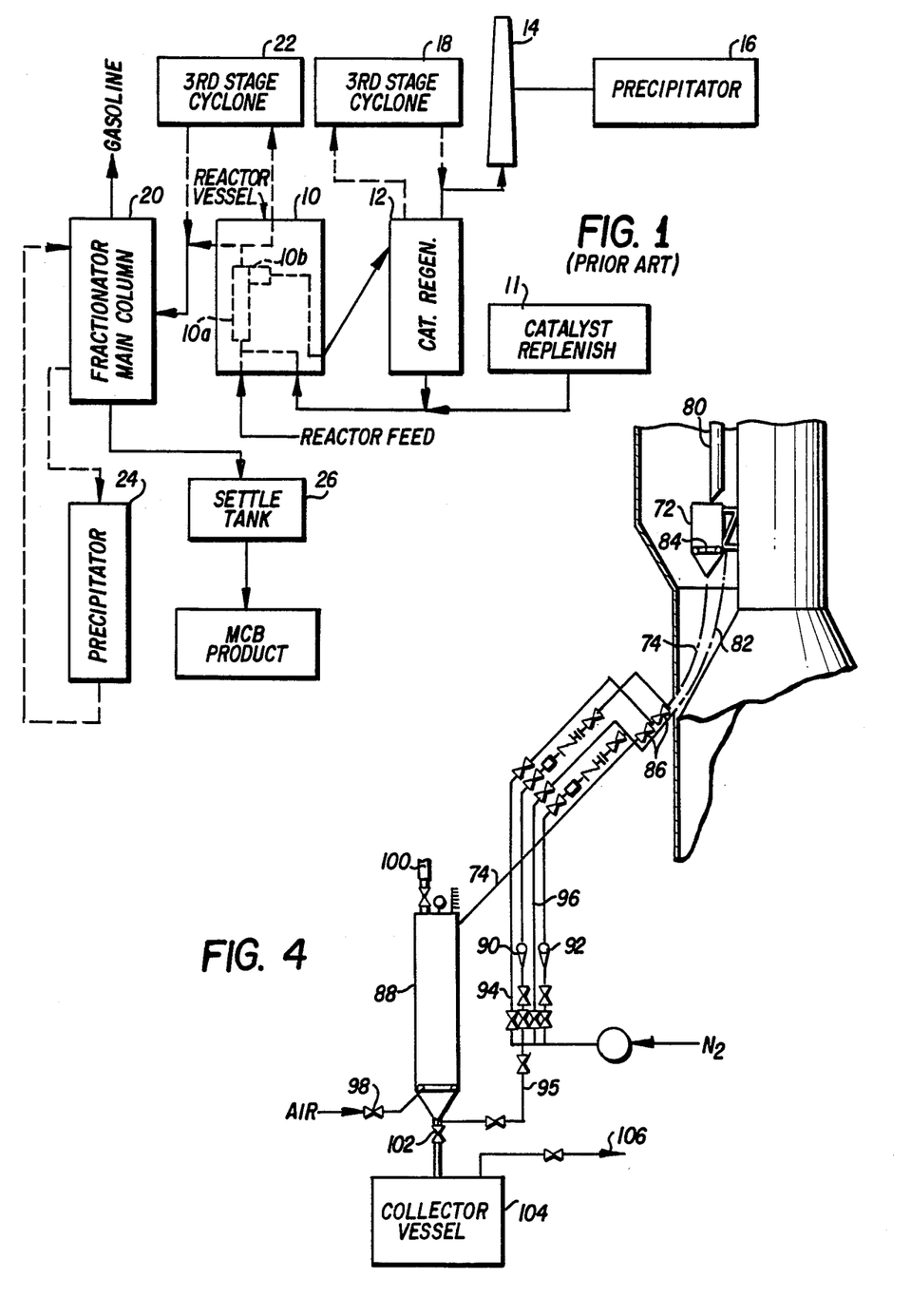
FIG. 1 is a block diagram illustrating a conventional prior art fluid catalytic cracking reactor system with various tertiary catalyst recovery devices utilized to meet environmental and product specifications.
FIG. 4 is a schematic view of the catalyst "fines" withdrawal system applicable to either the regenerator or reactor vessels.

By reference to FIG. 1, a typical FCC system is illustrated together with various known tertiary catalyst recovery systems. The hydrocarbon reactor feed is supplied to an FCC riser conversion zone 10a in a reactor vessel 10 along with regenerated catalyst from regenerator 12 and new catalyst from catalyst replenish 11, whereupon it travels through the riser conversion zone as previously noted and the hydrocarbons are catalytically cracked as usual. Using separator 10b, (which could be either riser cyclones or inertial separators), and then secondary cyclones, all contained within the reactor vessel 10, catalyst particles are separated from the cracked hydrocarbon effluent and these catalyst particles pass to a dense bed storage area in the lower portion of the reactor vessel 10. There may be stripping stations located in the lower portion of reactor vessel 10, where steam is passed through the separated catalyst in order to remove as much of the entrained and/or entrapped hydrocarbon materials from the catalysts as is possible. Then the catalyst is returned to a catalyst regenerator 12, where it is mixed with air and heated until hydrocarbon impurities remaining in and on the catalyst are burned off leaving regenerated catalyst. The gases from the burning process are passed through one or more cyclone separators, where the catalyst particulate matter is removed and the exhaust gases are passed into the atmosphere by way of stack 14.

Due to catalyst breakage during FCC conversion and regeneration, catalyst "fines" are created in the catalyst inventory which may have particle sizes less than 10 microns in diameter. These particles are very easily entrained in any gas flow and are generally not completely removed during the first stage of separation in the regenerator. Because it is undesirable to permit these particles to pass into the atmosphere through stack 14, several different types of equipment have been used in the past to reduce the amount of catalyst "fines" in the flue gases. An electrostatic precipitator 16 can be placed in the flue gas path through stack 14 and by virtue of charging the catalyst particles, can attract the particles to a catalyst disposal area. Additionally, a third stage cyclone separator 18 can be added in place of or in conjunction with the electrostatic precipitator to further reduce the volume of catalyst "fines" which are transmitted to the stack 14 and from there into the atmosphere.

The catalyst "fines" are also carried by way of the cracked hydrocarbon gaseous effluent leaving reactor vessel 10 into the fractionator main column 20 where they will tend to settle into the lowermost portion of the column contaminating the Main Column Bottom (MCB) products, such as carbon black oil and/or marine diesel fuel, produced therein. Marine diesel fuel specifications generally require no more than 50 ppm of catalyst "fines", and carbon black specifications generally require no more than 500 ppm of "fines". Thus, in order to maintain these product specifications, it has been necessary to utilize another or third stage cyclone 22, a liquid electrostatic precipitator 24, a settling tank 26, or a combination of all three, to remove catalyst "fines" from the liquid produced by the fractionator main column 20.

The addition of any tertiary catalyst recovery equipment is an expensive addition to existing systems and comprises a substantial anticipated expense with new refinery systems being built. Further, the movement of the flue gas or gaseous effluent through third stage cyclones and precipitators requires a certain amount of additional energy increasing the cost of refinery products. Furthermore, many refineries are utilizing flue gas expanders to obtain additional energy from the flue gas prior to its release to the atmosphere and the presence of significant quantities of catalyst particulate matter erodes the blades and degrades the performance of turbine expander systems.

SUMMARY OF THE INVENTION

It is an object of the present invention to provide a method and apparatus for insuring that a low percentage of catalyst particles are passed in the effluent flue gas to the atmosphere or in the hydrocarbon effluent to the fractionation stage of an FCC system.

It is a further object of the present invention to provide a method and apparatus for removing catalyst "fines" from the catalyst inventory in an FCC system.

It is a still further object of the present invention to provide a method and apparatus for eliminating the need for tertiary catalyst recovery systems, such as third stage cyclones, precipitators, settling tanks, etc. in an FCC system.

In its broadest method aspects, the above and other objects are achieved in accordance with the present invention in an FCC system by the steps of: withdrawing a portion of the catalyst inventory containing "fines" and replacing the withdrawn portion by a similar amount of catalyst which includes a lower percentage of "fines". These withdrawal and replacement steps serve to reduce the overall concentration of "fines" in the catalyst inventory.

In its broadest apparatus aspects, the above and other objects are achieved in accordance with the present invention in an FCC system having a catalyst inventory which includes "fines". A portion of the existing catalyst inventory which includes some "fines" is withdrawn through a suitable withdrawal conduit. The withdrawn catalyst is replaced by fresh catalyst from a catalyst replenishment store, where the fresh catalyst has a particle size larger than that of catalyst "fines", thus reducing the overall concentration of "fines" in the catalyst inventory.

In one method aspect, the above and other objects are achieved in accordance with the present invention in an FCC system having a reactor vessel by the steps of: passing the cracked hydrocarbon effluent through a riser separator and a primary cyclone separator to a secondary cyclone separator positioned within the reactor vessel; passing at least a portion of catalyst separated by the secondary cyclone to a temporary catalyst retaining area and from there, with the remainder of the catalyst, to a catalyst stripping zone; withdrawing from the reactor vessel a portion of catalyst in said temporary catalyst retaining area; passing the cracked hydrocarbons as an effluent from the secondary cyclone separator to a downstream fractionation apparatus; and passing the separated catalyst from the stripping zone to a regeneration vessel.

In one apparatus aspect, the above and other objects are achieved in accordance with the present invention in an FCC system having a reactor vessel which includes at least a first riser separator, at least a primary cyclone separator and at least a secondary cyclone separator. A conduit connects the secondary separator catalyst exhaust to a temporary catalyst retaining area in the form of a catalyst withdrawal pot. The pot collects catalyst particulate matter separated by the secondary cyclone. A conduit is provided in order that catalyst particulate material may be withdrawn from the withdrawal pot, with or without the aid of a fluidizing gas. The catalyst particulate matter is carried to a receiving vessel, where the catalyst particles can settle and cool before passing to a collector vessel and subsequent disposal.

In a further method aspect, the above and other objects are achieved in accordance with a further embodiment of the present invention in an FCC system having a regenerator vessel by the steps of: passing a gaseous effluent in the regenerator vessel from at least a first separator through at least a primary cyclone separator to at least a secondary cyclone separator positioned within the regenerator vessel; passing a gaseous effluent from the secondary cyclone separator to an exhaust stack outside the regenerator vessel; passing at least a portion of the catalyst separated by the secondary cyclone to a temporary catalyst retaining area and from there, with the remainder of the catalyst separated by the secondary cyclone, to the catalyst storage area; and withdrawing and disposing of a portion of catalyst contained in said temporary catalyst retaining area.

In a further apparatus aspect, the above and other objects are achieved in accordance with a second embodiment of the present invention in an FCC system having a regenerator vessel, where catalyst containing de-activating amounts of hydrocarbon is passed to a regenerator vessel for aeration and combustion of the de-activating hydrocarbon particles. Where the regenerator utilizes at least a first separator, at least a primary separator and at least a secondary separator to remove catalyst particles, at least a portion of particulate matter from the secondary cyclone separator in the regenerator vessel is passed to a temporary catalyst retaining area in the form of a catalyst withdrawal pot. A conduit connects the withdrawal pot to a receiving vessel and, with the aid of fluidizing nitrogen gas if needed, catalyst can be removed from the withdrawal pot and transported to the receiving vessel. After cooling in the receiving vessel, the catalyst particles are transported through a valve to a collection vessel and subsequent disposal.

The invention in any of the above embodiments can be configured as an original installation or as a retrofit to an existing fluid catalytic cracking (FCC) reactor/regenerator system.

BRIEF DESCRIPTION OF THE DRAWINGS

A more complete appreciation of the invention, and many of the attendant advantages thereof, will be readily apparent as the same becomes better understood by reference to the accompanying drawings, wherein.

DETAILED DESCRIPTION OF THE PREFERRED EMBODIMENTS

Figure 2:
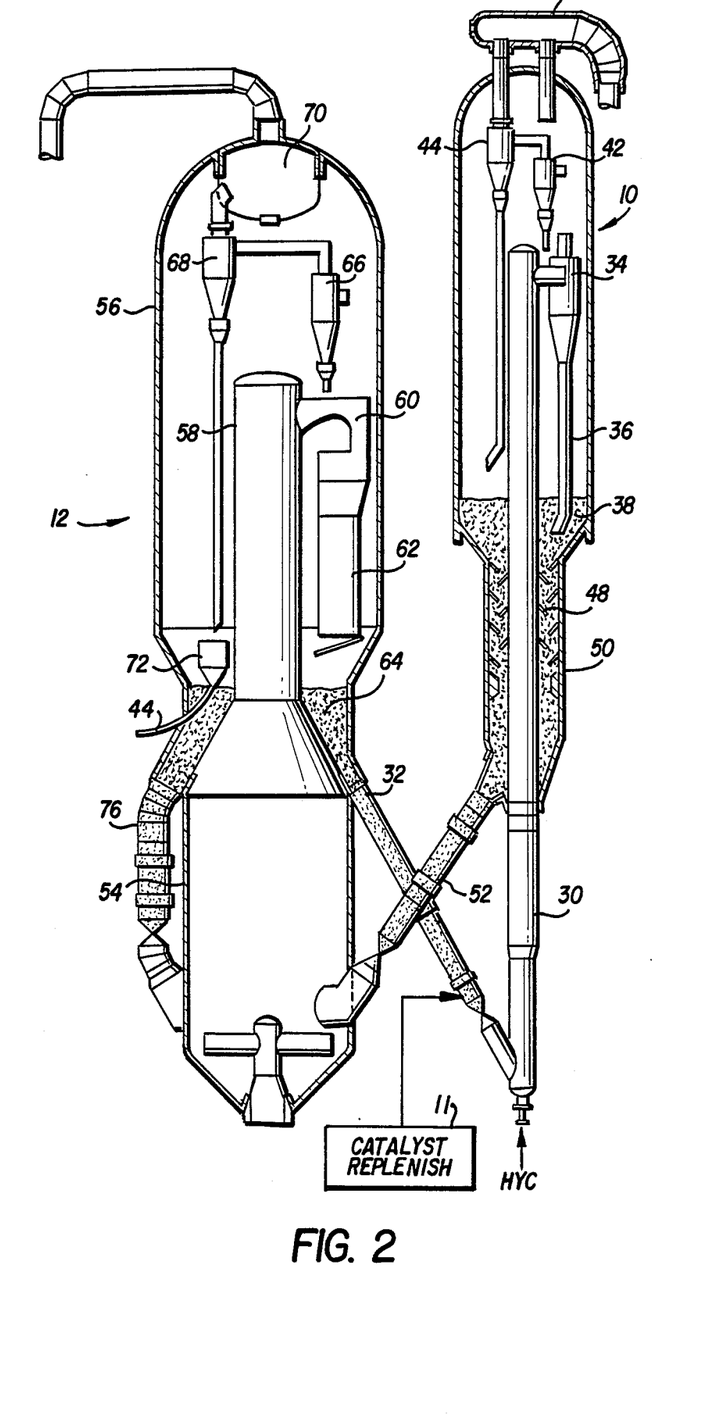
FIG. 2 is a side cross-sectional view of one embodiment of the present invention illustrating catalyst removal from a regneration vessel.

Referring now more particularly to the drawings, wherein like numerals represent like elements throughout the several views, FIG. 2 illustrates one embodiment of the present invention. A reactor vessel 10 at least partially encloses a riser conversion zone including tubular conduit riser 30. Hydrocarbon feed is supplied at the lower portion of riser 30 and mixed with regenerated catalyst from regenerator standpipe 32 and/or fresh catalyst from catalyst replenish 11, and the resultant mixture travels vertically upward towards the upper portion of riser 30. Upon reaching riser 30, the hydrocarbon feed and catalyst mixture passes into a riser cyclone separator 34 as is well known. Riser separator 34 has a catalyst exhaust 36 which exits below the level of catalyst in dense bed catalyst storage area 38.

Gaseous hydrocarbon effluent from separator 34 can be passed by means of a conduit 40 (illustrated in FIG. 3 but not in FIG. 2) into primary cyclone separator 42, or can pass directly into the interior of the reactor vessel 10 and from there into the intake of separator 42. The catalyst particles exit from the primary cyclone separator 42 and fall into the dense bed storage area 38. The gaseous effluent from the primary cyclone separator 42 passes to the intake of reactor vessel secondary cyclone separator 44. Catalyst particles in the FIG. 2 embodiment pass from the secondary cyclone separator 44 into the dense bed storage area 38 with exhaust effluent from the secondary separator passing into conduit 46 which carries the gaseous hydrocarbons to a quenching and/or fractionation stage.

Catalyst particles, accummulating in the dense bed catalyst storage area 38, travel downward past baffles 48 located in catalyst stripping zone 50 which is supplied with steam as the primary stripping gas. Hydrocarbon materials entrained with the catalyst particles are stripped therefrom and pass upwardly into reactor vessel 10, whereupon they can be withdrawn into the inlet of primary cyclone separator 42, as shown in FIG. 2.

After stripping, catalyst particles pass into the reactor standpipe 52 and from there pass to the regenerator 12 and specifically into the lower portion of regenerator 54. The catalyst particles are combined with air and sufficient heat is provided to permit rapid oxidation of any remaining hydrocarbon particles or components entrained with the catalyst and the mixture travels upward through regenerator conduit 58 and into a first separator in the form of inertial separator 60. Here the regenerated catalyst is permitted to fall down separator catayst exhaust 62 into regenerated catayst storage area 64. The gaseous component (hereinafter called flue gas) with some entrained catalyst particles passes into the inner portion of the upper regenerator and from there is drawn into regenerator primary cyclone separator 66, which deposits separated catalyst particles into the catalyst storage area and provides flue gas to regenerator secondary cyclone separator 68. The secondary cyclone separator 68 removes the smaller catalyst particles from the flue gas and exhausts flue gas into plenum 70, which travels from there to the atmosphere through stack 14 (not shown in FIG. 2).

In accordance with the present invention, any withdrawal of the catalyst inventory (catalyst contained within the regenerator, the reactor, connecting conduits and standpipes, etc.) will involve a withdrawal of "fines" from the system. If the withdrawn catalyst is replaced with catalyst from catalyst replenish 11 which contains a smaller quantity of "fines", the overall concentration of "fines" in the inventory will be reduced and fewer "fines" will be available for contaminating the regenerator flue gas or MCB products. However, to the extent that non-selective catalyst withdrawal also disposes of non-"fines" or larger catalyst particles, it is preferred to withdraw only catalyst with a high concentration of "fines".

Referring again to FIG. 2, and due to the two preceding separation systems (inertial separator 60 and primary cyclone separator 66), the particle size of catalyst exiting secondary cyclone separator 68 is extremely small and thus has a high concentration of "fines". A temporary catalyst retaining area in the form of a catalyst withdrawal pot 72 is provided immediately under the catalyst exit of the secondary cyclone separator 68 to temporarily retain these catalyst "fines." A withdrawal conduit 44 serves to controllably withdraw catalyst "fines" which have collected in the catalyst withdrawal pot 72. Although such catalyst withdrawal could operate continuously, in a preferred embodiment it operates intermittently at a relatively high volume rate of flow, as a steady state flow rate would be difficult to maintain given the extremely small particle size and the problem of settling and packing which takes place in extremely small line sizes. When the catalyst withdrawal pot has been filled, the excess catalyst merely overflows into the regenerated catalyst storage area and can be recirculated through the regenerator by passage through the catalyst recirculation standpipe 76.

It can now be understood that the amount of catalyst "fines" in the catalyst inventory, contained in the reactor vessel catalyst storage area 38 and in the regenerator catayst storage area 64 can be controlled so as to effectively minimize catalyst "fines" which are entrained with either the hydrocarbon effluent passing out of conduit 46 towards the downstream fractionation stage or flue gases passing through plenum 70 towards stack 14 to be released to the atmosphere. As the percentage of catalyst "fines" is reduced, there will be fewer particles of this size which can be entrained in either the hydrocarbon flow or flue gas flow. As these particles are withdrawn from the closed system, the number of particles of this size that are available in the catalyst inventory for contaminating the main column bottom (MCB) products of the fractionation device or the flue gas from the regenerator, can be closely monitored and controlled. Thus, by selective withdrawal of catalyst "fines" from the catalyst inventory in an FCC system, the need for tertiary catalyst recovery systems, such as a third stage cyclone, electrostatic gas and liquid precipitators, settling tanks, etc. is reduced or eliminated completely.

It will be understood that the catalyst output from the secondary cyclone 68 is utilized to feed the withdrawal pot in FIG. 2 because it would contain a much higher percentage of catalyst "fines" than would the regenerated catalyst storage area 64 which is supplied with substantially larger catalyst particles from separator exhaust 62 and from the particle exhaust of the primary cyclone separator 66. However, there is no requirement that the "fines" withdrawal be confined only to the regenerator, and indeed the secondary cyclone separator 44 in the reactor vessel could also be used as a source for withdrawing "fines", as is shown in FIG. 3.

Figure 3:
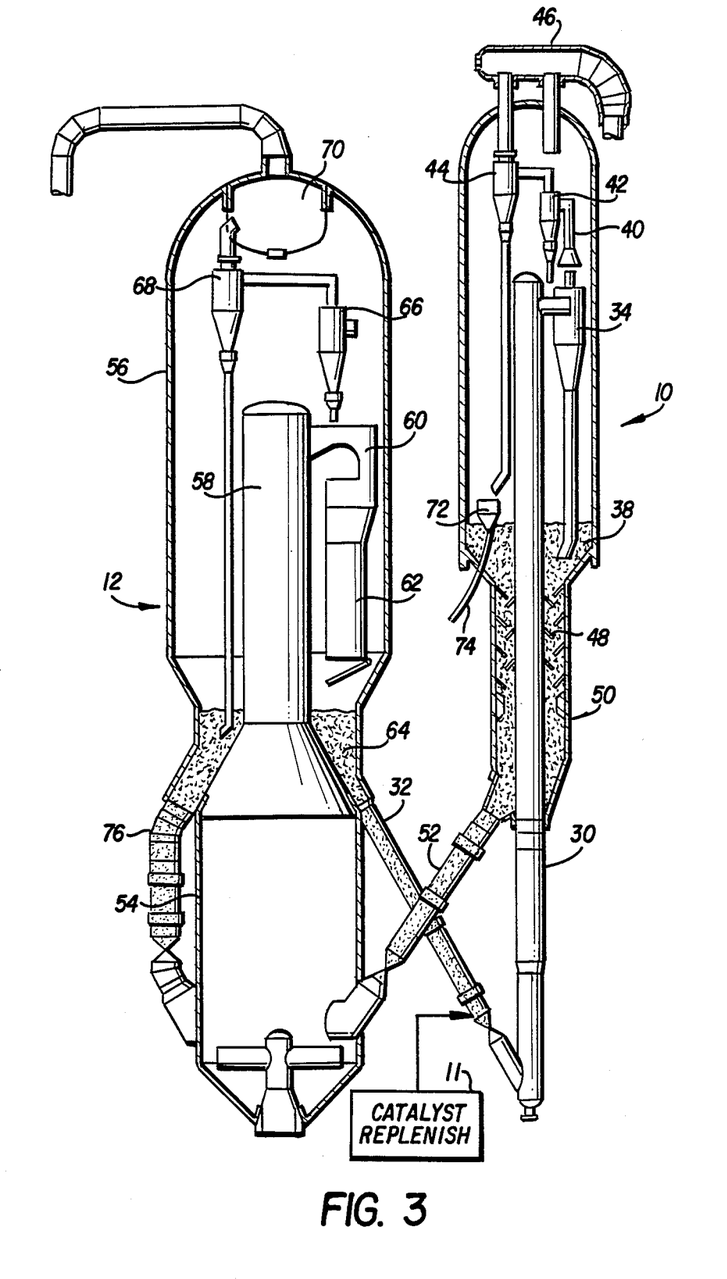
FIG. 3 is a side cross-sectional view of a second embodiment of the present invention illustrating catalyst removal from a reactor vessel.

FIG. 3 illustrates essentially the same FCC system as in FIG. 2, with the exception that the reactor vessel operates as a closed cyclone system with the effluent from riser separator 34 passing directly through conduit 40 to the inlet of primary cyclone separator 42. The only other significant difference is the location of the catalyst withdrawal pot 72 under the reactor secondary cyclone separator 44, rather than under the regenerator secondary cyclone separator, as in FIG. 2. Otherwise, the operation of the catalyst withdrawal system and its effect on the reduction of catalyst "fines" in flue gas and MCB products would be similar to that previously discussed with reference to FIG. 2. In fact, in some circumstances it may be desirable to have a "fines" withdrawal system in both the regenerator vessel and the reactor vessel, which would merely be a combination of FIGS. 2 and 3.

With respect to the specific apparatus for withdrawing "fines" from the catalyst inventory, FIG. 4 illustrates one embodiment of such a system. In FIG. 4, secondary cyclone separator catalyst conduit 80 could be from either reactor secondary cyclone separator 44 or from regenerator secondary cyclone separator 68 depending upon whether the "fines" withdrawal system is located in reactor 10 or regenerator 12. The catalyst withdrawal pot 72 is located under the catalyst conduit 80, such that catalyst flowing therethrough accumulates at least temporarily in the catalyst withdrawal pot 72.

It has been found that the quantity of "fines" to be withdrawn is small compared to the quantity accumulating in the withdrawal pot. For continuous withdrawal, the pipe is equipped with a restriction orifice with an internal diameter on the order of $\frac{1}{8}$", and great difficulty is encountered in attempting to cause "fines" to flow from the withdrawal pot through the small diameter orifice. However, it has been found that an intermittent operation with a larger diameter will facilitate the desired withdrawal, while keeping the overall quantity of withdrawn catalyst within the desired limits.

As previously noted, particulate size is extremely small and because any quantity of catalyst particles is subject to compaction and blockage of small diameter orifices or pipes, catalyst withdrawal conduit 74 in one embodiment would be a one-inch diameter, schedule 80, type 304 stainless steel pipe. An additional purge conduit 82 supplies nitrogen under pressure to ring 84 in which are located a plurality of holes therearound. In the event the catalyst "fines" in the catalyst withdrawal pot 72 bridge the opening to withdrawal conduit 74, a blast of high pressure nitrogen through purge conduit 82 and ring 84 and/or conduit 74 will break up the agglomerating particles facilitating flow down through the catalyst withdrawal conduit 74.

Valves 86 in FIG. 4 facilitate the intermittent withdrawal of "fines" accumulating in withdrawal pot 72. The withdrawal conduit 74 opens into receiving vessel 88 and in order to withdrawal "fines" from the withdrawal pot, the receiving vessel 88 is closed off to the atmosphere. Upon opening of valves 86, "fines" begin to flow from the withdrawal pot 72 into the receiving vessel 88 due to the higher pressure in the vessel in which the withdrawal pot is located (either the reactor vessel or the catalyst regenerator). Flow through withdrawal conduit 74 will terminate when receiving vessel 88 reaches the same pressure present in the catalyst withdrawal pot 72. Nitrogen gas is supplied through rotometer 90 to aid in particle flow in withdrawal conduit 74 and fluidizing nitrogen for catalyst withdrawal pot 72 is provided through rotometer 92 and purge conduit 82. As previously noted, blast connections 94 and 96 can be used to free blocked sections in withdrawal conduit 74 or to break up fines bridging in the withdrawal pot 72 or the receiving vessel 88.

After flow into the receiving vessel 88 terminates due to pressure equalization between vessel 88 and catalyst withdrawal pot 72, valves 86 are closed permitting catalyst "fines" transmitted to receiving vessel 88 to be cooled by the admission of cooling air or nitrogen through valve 98 and exiting through vent 100 or by simple heat transmission through the walls of receiving vessel 88 into the ambient air.

Receiving vessel 88 is emptied through valve 102 into collector vessel 104 by pressurizing receiving vessel 88 through valve 98 with vent 100 closed. If desirable, vent 100 and the collector vessel vent 106 can be connected to dust filters or other particulate containment means. Both the receiving vessel 88 and collector vessel 104 are dimensioned according to the amount and frequency of "fines" withdrawal. Typically, "fines" flowing from one secondary cyclone dipleg exceed the desired withdrawal rate and thus excess "fines" overflow the withdrawal pot after it has been filled.

Figure 5:
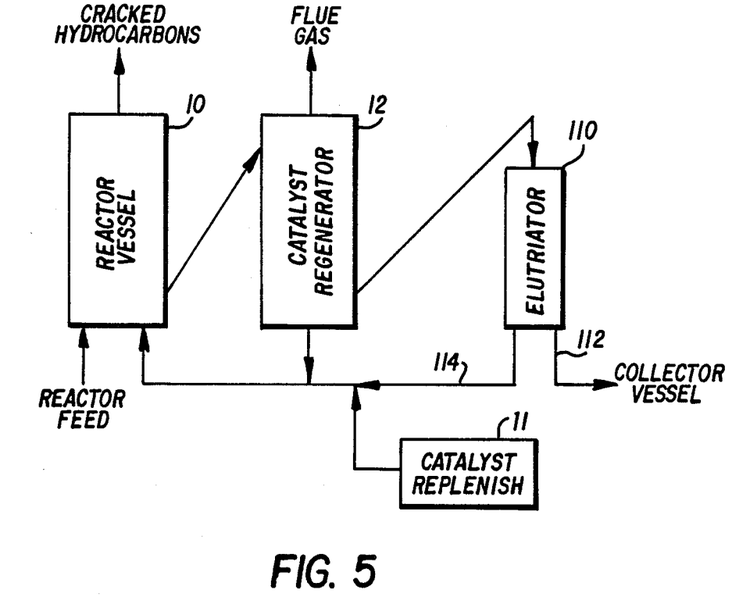
FIG. 5 is a block diagram illustrating a further embodiment of the present invention.

FIG. 5 illustrates a further embodiment of the present invention, which is a refinement of the previously discussed nonselective catalyst withdrawal method and apparatus. The reactor vessel 10, the catalyst regenerator 12 and the catalyst replenish 11 cooperate in the manner disclosed in FIG. 1. A non-selective catalyst withdrawal occurs from the reactor vessel 10 or, as shown in FIG. 5, the catalyst regenerator 12. This nonselective withdrawal passes "fines" as well as larger catalyst particles to a means for separating catalyst according to particle size which, in FIG. 5, is elutriator 110. A fines output 112 passes the separated "fines" to a collector vessel and the larger particle output 114 returns the remainder of the catalyst to the catalyst inventory, either directly to the reactor vessel 10 or catalyst regenerator 12, or as in FIG. 5, to be mixed with the replenish catalyst and supplied to the reactor vessel. Because only the catalyst "fines" are disposed of the FIG. 5 embodiment, it would be more efficient than a non-selective catalyst disposal of all withdrawn catalyst.

In view of the above disclosure, many modifications and variations on this catalyst "fines" withdrawal system will become obvious to those of ordinary skill in the art. For example, the fines withdrawal system could be provided for either a reactor vessel or a regenerator vessel or both should a high volume "fines" withdrawal rate be desired. The "fines" withdrawal could be located in conjunction with a catalyst supply system so as to maintain the desired inventory of catalyst in a closed reactor/regenerator system while still reducing the level of "fines" in the catalyst inventory. Various other temporary containment systems and apparatus for removing catalyst "fines" from the withdrawal pot will become obvious in view of the above disclosure. Therefore, the present invention is not limited by the above disclosure, but is only limited by the scope of the claims attached hereto.

The embodiments of the invention in which an exclusive property or privilege is claimed are defined as follows:

We claim:

1. A method for reducing catalyst particulate contamination in fluid catalyst cracking process, where catalyst, having passed through a reactor vessel and accumulated deactivating hydrocarbons is passed to a regenerator vessel, said method comprising the steps of:

passing a gaseous effluent in said regenerator vessel from at least a first separator through at least a primary cyclone separator to at least a secondary cyclone separator positioned within the regenerator vessel;

passing a gaseous effluent from the secondary cyclone separator to an exhaust outside the regenerator vessel;

passing at least a portion of the catalyst separated by the secondary cyclone to a temporary catalyst retaining area located in said regenerator vessel and from there to a catalyst storage area; and withdrawing from said regenerator vessel a portion of catalyst contained in said temporary catalyst retaining area.

2. The method according to claim 1, wherein prior to said passing a gaseous effluent step the method includes the further steps of:

passing a mixture, as a suspension, of a hydrocarbon feed and a catalyst through a riser conversion zone contained within a reactor vessel and cracking said hydrocarbon feed in the riser conversion zone;

passing the mixture from the riser conversion zone to a separator positioned within the reactor vessel;

separating catalyst from the mixture in the separator;

passing a gaseous effluent from the separator to a downstream fractionation apparatus;

passing the catalyst separated by the separator to a catalyst stripping zone positioned within the reactor vessel;

removing hydrocarbons entrained with the separated catalyst through the use of a stripping gas;

passing the separated catalyst from the stripping zone to a regeneration vessel;

regenerating the catalyst in the regenerator by combining the separated catalyst with air at high temperature and oxidizing hydrocarbons retained on the catalyst;

passing said regenerated catalyst into at least a first separator, passing the catalyst to said catalyst storage area from at least the first separator;

passing separator effluent from said at least first separator to at least a primary cyclone separator positioned within the regenerator; and passing at least a portion of the catalyst separated by said at least primary cyclone to said catalyst storage area.

* * * * *

UNITED STATES PATENT AND TRADEMARK OFFICE
CERTIFICATE OF CORRECTION

PATENT NO. : 4,853,107

DATED : August 1, 1989

INVENTOR(S) : Haddad et al

It is certified that error appears in the above-identified patent and that said Letters Patent is hereby corrected as shown below:

The title page should be deleted to appear as per attached title page.

Signed and Sealed this

Twenty-ninth Day of December, 1992

Attest:

DOUGLAS B. COMER

Attesting Officer

Acting Commissioner of Patents and Trademarks

United States Patent [19]
Haddad et al.

[11] Patent Number: 4,853,107
[45] Date of Patent: Aug. 1, 1989

[54] METHOD AND APPARATUS FOR REMOVING SMALL CATALYST PARTICLES IN FCC SYSTEMS

[75] Inventors: James H. Haddad, Princeton Junction; Hartley Owen, Belle Mead, both of N.J.

[73] Assignee: Mobil Oil Corp., New York, N.Y.

[21] Appl. No.: 667,661

[22] Filed: Nov. 2, 1984

[51] Int. Cl.$^4$ .................................. C106 11/18
[52] U.S. Cl. .................................. 208/152; 208/113; 208/161; 208/164
[58] Field of Search ............. 208/152, 149, 153, 161, 208/164, 113; 422/145, 144, 147

[56] References Cited

U.S. PATENT DOCUMENTS

| | | | |
|---|---|---|---|
| 2,596,748 | 5/1952 | Watson et al. | 208/152 |
| 2,786,800 | 3/1957 | Myers | 208/152 |
| 2,893,949 | 7/1959 | Prater | 208/150 |
| 2,984,358 | 5/1961 | Johnston | 208/152 |
| 3,083,082 | 3/1963 | Kleiber | 208/161 |
| 3,554,903 | 1/1971 | Wilson | 208/164 |
| 4,055,486 | 10/1977 | Choi et al. | |
| 4,220,623 | 9/1980 | Jahnke et al. | |
| 4,282,084 | 8/1981 | Gross | |
| 4,337,068 | 6/1982 | MacLean et al. | |
| 4,387,043 | 6/1983 | Vickers et al. | |
| 4,394,349 | 7/1983 | Cartmell | 208/153 |
| 4,404,095 | 9/1983 | Haddad et al. | 208/153 |

Primary Examiner—Anthony McFarlane
Attorney, Agent, or Firm—Alexander J. McKillop; Charles J. Speciale; Dennis P. Santini

[57] ABSTRACT

Disclosed is a method of and apparatus for reducing the level of extremely small catalyst particles ("fines") in an FCC system by temporarily retaining particles separated from the secondary cyclone separator in either a reactor vessel or catalyst regenerator. These particles can be withdrawn from the temporary retaining area, which takes them out of the active catalyst inventory within the reactor/regenerator system. The withdrawing of catalyst "fines" reduces the particulate contamination both in flue gas exhausted to the atmosphere from the catalyst regenerator and in the main column bottom (MCB) products from the fractionation stage. Preferred embodiments include withdrawal of "fines" from either the regenerator or the reactor vessels and the secondary cyclones contained in each of these vessels.

2 Claims, 4 Drawing Sheets